(No Model.) 2 Sheets—Sheet 1.
G. H. KINTER & G. D. TELLER.
BRAKE FOR RAILWAY CARS.
No. 530,185. Patented Dec. 4, 1894.
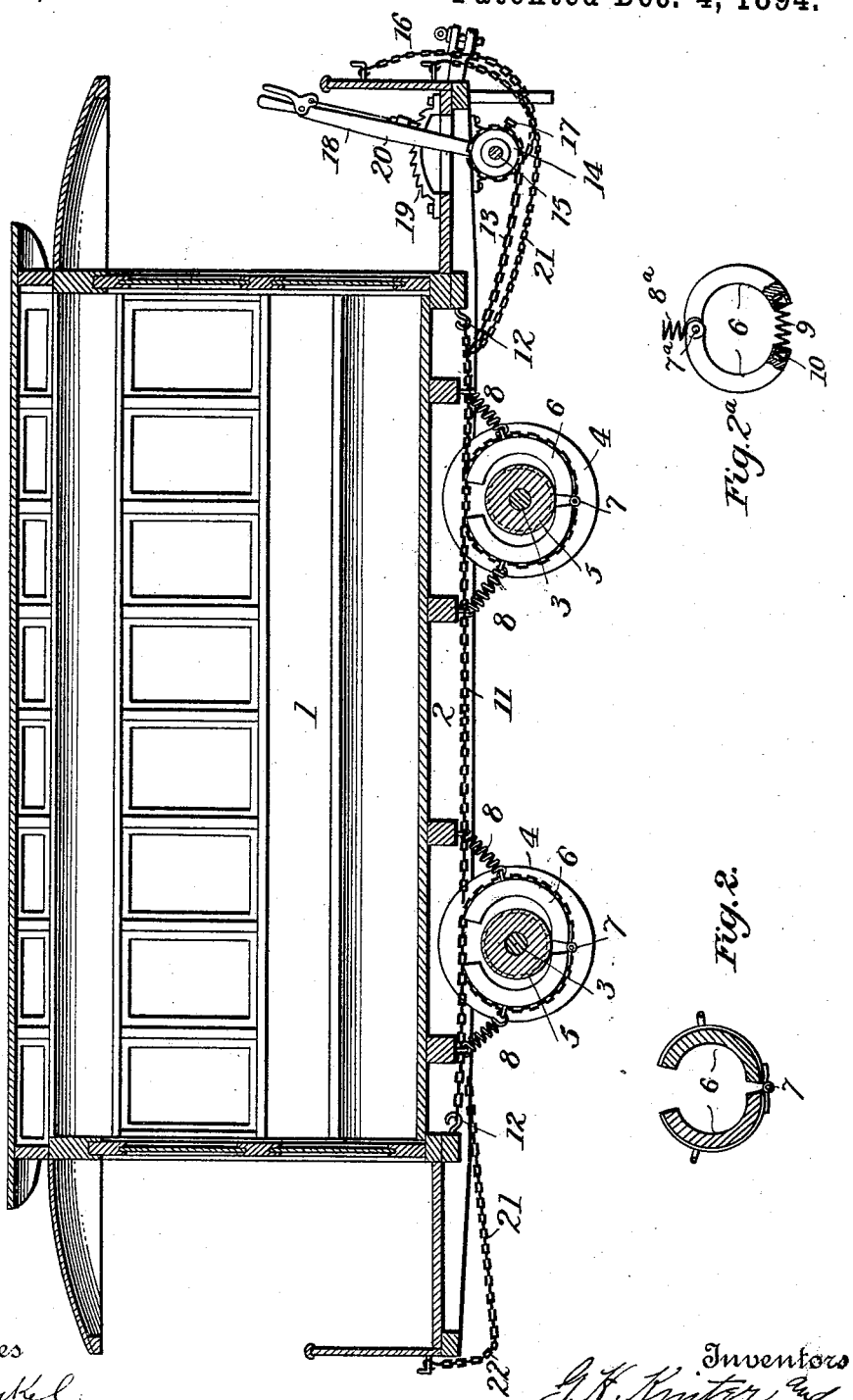
Witnesses
J. G. Hinkel
Will E. Neff
Inventors
G. H. Kinter and
G. D. Teller
By J. H. Watson Attorney (No Model.) 2 Sheets—Sheet 2.
G. H. KINTER & G. D. TELLER.
BRAKE FOR RAILWAY CARS.
No. 530,185. Patented Dec. 4, 1894.
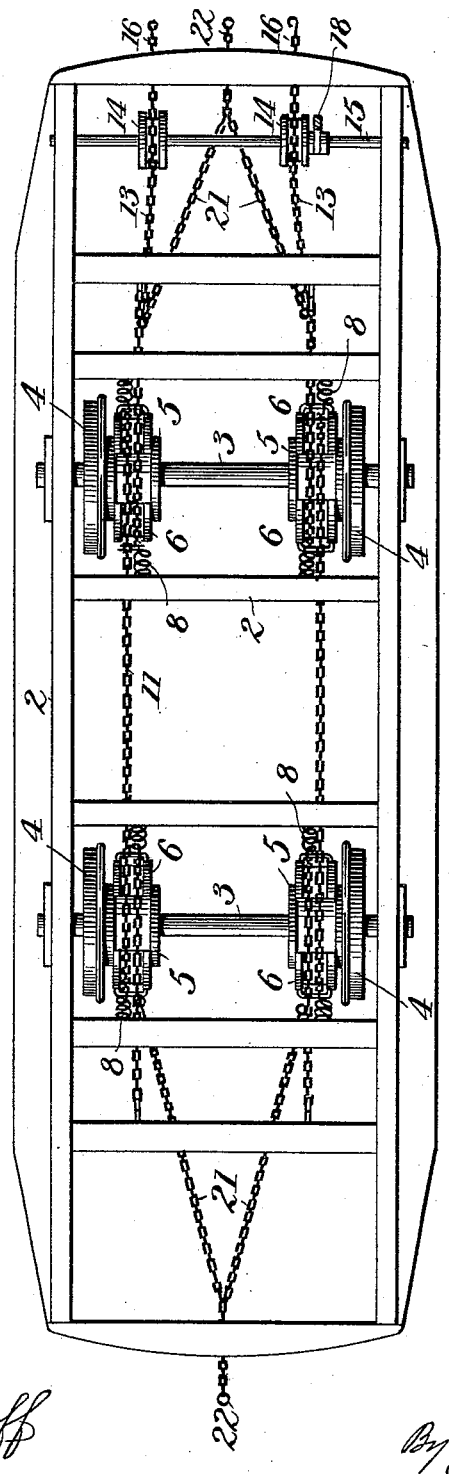
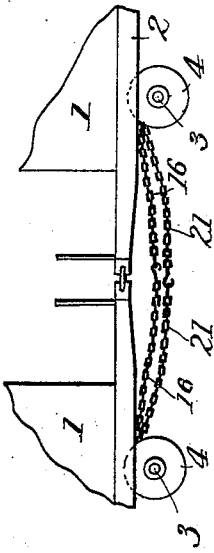
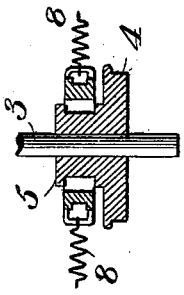
Witnesses
J. G. Hinkel
Will E. Neff
Inventors
G. H. Kinter and
G. D. Teller
By J. H. Watson Attorney

UNITED STATES PATENT OFFICE.

GEORGE H. KINTER AND GEORGE D. TELLER, OF BUFFALO, NEW YORK, ASSIGNORS OF ONE-THIRD TO GEORGE TAIT, OF SAME PLACE.

BRAKE FOR RAILWAY-CARS.

SPECIFICATION forming part of Letters Patent No. 530,185, dated December 4, 1894.

Application filed March 2, 1894. Serial No. 502,078. (No model.)

*To all whom it may concern:*

Be it known that we, GEORGE H. KINTER and GEORGE D. TELLER, residents of the city of Buffalo, in the county of Erie and State of New York, have invented certain new and useful Improvements in Car-Brakes, of which the following is a specification.

Our invention relates to improvements in car brakes.

The object of the invention is to provide a simple, cheap and reliable brake mechanism for railway cars, suitable for making either ordinary or emergency stops, and also to provide a safety device whereby our improved brake may be automatically applied to any car becoming accidentally separated from a train.

Our invention consists in providing brake drums mounted upon and rigidly connected to the car axles, contractile brake shoes suspended from the car frames or trucks and embracing the brake drums, and chains extending lengthwise of the cars, each chain having a loop around the brake shoes of the drums to which it is applied. We preferably arrange the brake drums inside of and close to the car wheels, allowing a drum to each wheel, so as to prevent torsional strain in the axle. We provide connections between the main chains which encircle the brake shoes and an operating device or devices upon one or both platforms of the car. We also provide means for locking the brakes upon the drums and for operating the braking and locking devices automatically should a train of cars part accidentally, as by the breaking of a coupling.

For a fuller description of the nature and operation of our invention, reference is had to the accompanying drawings, which form a part of this specification, and in which—

Figure 1 is a longitudinal sectional elevation of a car equipped with our improved brake. Fig. 2 is a sectional view of a pair of brake shoes detached. Fig. 2ª shows a different arrangement of the brake shoes. Fig. 3 is a plan view of the under frame of a car, the body and floor being removed. Fig. 4 is a section through one of the brake drums and wheels, and Fig. 5 shows the contiguous ends of two cars coupled together.

Referring to the drawings, 1 indicates the body of a tram car and 2 the frame-work beneath the car. Suitably journaled in the frame-work are the axles 3 upon which are the usual wheels 4, and also brake drums 5 which, as shown, are cast integral with the wheels. These drums however may be separate from the wheels, in which case they are rigidly connected to the axles in some suitable manner. Contractile brakes shoes 6, partially encircling the drums, are hinged or jointed together, and suspended from the car truck or frame.

As illustrated in Fig. 1 the shoes are connected together by a hinge 7 and suspended from the car frame by spiral springs 8, said springs being arranged to draw the shoes apart and away from the brake drum, as well as to sustain the weight of the shoes.

In Fig. 2ª the shoes 6 are hinged together at their upper extremities by a pin 7ª and suspended by a single spiral spring 8ª. The shoes are normally forced apart at their lower ends by a spiral spring 9 having its ends in sockets 10 in the shoes.

Main chains 11 extend lengthwise of the car and are attached to the car frame at each end by hooks or suitable fastenings 12. As illustrated, there is one of these chains upon each side of the car and in line with the brake drums, and each chain has loops which encircle the brake shoes of the drums over which it extends. The chains are independent of the brake shoes and in the operation of the brakes they may slip upon the shoes. Furthermore, the shoes being free from the chains always return to their normal positions, when the tension of the chains is relaxed, by virtue of the springs 8 or 8ª which sustain the shoes.

The brakes are applied by drawing upon the main chains at either end thereof, and they may therefore be applied from either platform, although we have for convenience only shown a brake lever upon one platform. To the main chain 11 we connect operating chains 13, which latter chains are connected to winding drums 14 upon a shaft 15 extending across the frame beneath the car platform. To these winding drums are also connected safety chains 16, which, for convenience, may be continuations of the chains 13, set screws 17 being used to connect the chains to the drums. An operating lever 18 is rigidly connected to the shaft 15 and a toothed sector 19 and pawl 20 is provided for locking the lever.

The vertical shafts with ratchet wheels and bevel gears, now commonly used on vestibuled cars, may be substituted for the lever and sector, if desired.

Connecting chains 21 are provided for connecting the main chains of one car to those of the adjacent cars. For convenience in coupling, these chains are preferably connected to single chains 22 at the ends of the cars, the chains 22 being provided with suitable hooks or couplings at their extremities.

When cars are coupled together one or both safety chains at the end of each car are connected with the adjacent car, and their respective connecting chains are also coupled together. When the brake lever is drawn back, the operating chains 13 draw the main chains and tighten the loops about the brake shoes, thus contracting the shoes upon the brake drums and applying the brakes. The brakes next to the operating lever take effect first. Immediately when they come in contact with the drum they rotate slightly with the drum and aid in tightening the loops upon the brake shoes next in the rear. This operation very materially assists the brakemen in putting on the brakes and very largely reduces the labor incident thereto. We find that the brakes can be applied instantly, when haste is necessary, and that the retarding force of the brakes can be utilized in any degree required. The connecting chains transmit the movement from the main chains of one car to those of the adjacent car and in this manner the brakes may be applied from one end of a train to the other very quickly, the power required to set each brake being transmitted partly from the lever and partly from the brake ahead, which has been previously set.

Should the couplings break between two cars, the safety chains, before breaking, will rotate the drums 14 and set the brakes upon the detached cars. The lever 18 will at the same time be thrown back and automatically locked so that the brakes will remain applied and the cars be quickly stopped, thus preventing collision with the forward part of the train. We preferably make the safety chains lighter than the operating chains 13 so that they will break before sufficient strain is put upon the operating chains to break the latter. For a similar reason the connecting chains are made slightly lighter than the main chains.

While we have shown our improvements applied to a tram car, it will be evident that they are equally applicable to other cars, either with or without trucks. In case trucks are used the brake shoes would naturally be suspended from the truck frames instead of from the car body. In the claims we shall use the words "car frame" as a term including either the main frame or the truck frame of a car.

It will be evident that various changes in the details of the construction of our invention may be made without departing from the spirit thereof. Thus, for instance, wire ropes or other cables may be used instead of chains, although we prefer the latter, as slack or wear in any of the parts may be readily taken up by unhooking the chains and connecting to other links.

Therefore, without limiting ourselves to the precise construction and arrangement of parts shown and described, we claim—

1. In a car brake, the combination with an axle and a brake drum upon said axle, of contractile brake shoes suspended from the car frame and arranged around the drum, and a chain or cable, independent of the brake shoes, extending lengthwise of the car and having a loop or convolution surrounding said brake shoes, substantially as described.

2. In a car brake, the combination with a plurality of axles provided with brake drums, of brake shoes suspended from the car frame and arranged around the drums, and a chain or cable, independent of the brake shoes, extending lengthwise of the car and having loops or convolutions surrounding the brake shoes, substantially as described.

3. In a car brake, the combination with a plurality of axles provided with brake drums, of brake shoes arranged around the drums and suuspended from the car frame by yielding connections, and a chain or cable extending lengthwise of the car and having loops or convolutions surrounding the brake shoes, substantially as described.

4. In a car brake, the combination with an axle and a brake drum upon said axle, of brake shoes surrounding the drum, a chain or cable extending lengthwise of the car and having a loop around the brake shoes, a winding-drum to which the chain is connected, a locking device for the winding-drum, and an extension of the chain from the winding-drum adapted to be connected to an adjoining car, whereby the brake is automatically set and the winding-drum locked when the cars become separated, substantially as described.

5. In a car brake, the combination with a plurality of axles provided with brake drums, of brake shoes suspended from the car and arranged around the drum, a main chain or cable extending lengthwise of the car and having loops or convolutions surrounding the brake shoes, operating chains and winding drums therefor for operating the brakes, and connecting chains for uniting the main chains of adjacent cars, substantially as described.

GEO. H. KINTER.
GEORGE D. TELLER.

Witnesses:
CHAS. ROGERS,
JAS. L. CORNER.